(12) United States Patent
Saida et al.

(10) Patent No.: US 7,691,157 B2
(45) Date of Patent: Apr. 6, 2010

(54) SOLID ELECTROLYTIC CAPACITOR AND METHOD FOR PRODUCING THE SAME

(75) Inventors: Yoshihiro Saida, Nagano (JP); Hiroshi Konuma, Nagano (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 178 days.

(21) Appl. No.: 11/667,952

(22) PCT Filed: Nov. 18, 2005

(86) PCT No.: PCT/JP2005/021633

§ 371 (c)(1),
(2), (4) Date: Jun. 1, 2007

(87) PCT Pub. No.: WO2006/054795

PCT Pub. Date: May 26, 2006

(65) Prior Publication Data

US 2008/0049381 A1    Feb. 28, 2008

Related U.S. Application Data

(60) Provisional application No. 60/631,988, filed on Dec. 1, 2004.

(30) Foreign Application Priority Data

Nov. 19, 2004   (JP)   ............................ 2004-335905

(51) Int. Cl.
*H01G 9/00* (2006.01)

(52) U.S. Cl. ...................................... 29/25.03; 361/523

(58) Field of Classification Search ................ 29/25.03; 361/523, 525
See application file for complete search history.

(56) References Cited

U.S. PATENT DOCUMENTS

| 4,910,645 | A | 3/1990 | Jonas et al. |
| 5,530,139 | A | 6/1996 | Saida et al. |
| 5,853,794 | A | 12/1998 | Melody et al. |
| 6,229,689 | B1 | 5/2001 | Kobayashi et al. |
| 6,351,370 | B1 | 2/2002 | Konuma et al. |
| 6,731,497 | B2 * | 5/2004 | Yokouchi et al. ............ 361/525 |

FOREIGN PATENT DOCUMENTS

| JP | 9-306788 A | 11/1997 |
| JP | 11-195556 A | 7/1999 |
| JP | 11-283875 A | 10/1999 |
| JP | 2000-228331 A | 8/2000 |
| JP | 3187380 B2 | 5/2001 |
| JP | 2001-250743 A | 9/2001 |
| JP | 3478987 B2 | 10/2003 |

* cited by examiner

*Primary Examiner*—Eric Thomas
(74) *Attorney, Agent, or Firm*—Sughrue Mion, PLLC

(57) ABSTRACT

The present invention relates to a method for producing a solid electrolytic capacitor in which a solid electrolyte layer is provided by a process comprising a step of dipping a valve-acting metal having thereon a dielectric film layer in a monomer-containing solution, followed by drying (Step 1), a step of dipping the valve-acting metal in an oxidizing agent-containing solution, followed by drying (Step 2), and a step of dipping the valve-acting metal in an oxidizing agent-free solution, followed by drying (Step 3); and to a solid electrolytic capacitor produced thereof. According to the present invention, a thin capacitor element with reduced failure of short circuit and less fluctuation in the element shape can be stably produced, the number of capacitor elements stacked in a solid electrolytic capacitor chip can be increased to realize high capacitance, and a solid electrolytic capacitor element suitable for a solid electrolytic multilayer capacitor with less fluctuation in the equivalent series resistance can be provided.

11 Claims, 3 Drawing Sheets

SOLID ELECTROLYTIC CAPACITOR AND METHOD FOR PRODUCING THE SAME

CROSS REFERENCE TO THE RELATED APPLICATIONS

This is an application filed pursuant to 35 U.S.C. Section 111(a) with claiming the benefit of U.S. Provisional Application Ser. No. 60/631,988 filed Dec. 1, 2004 under the provision of 35 U.S.C. Section 111(b), pursuant to 35 U.S.C. Section 119(e)(1).

TECHNICAL FIELD

The present invention relates to a solid electrolytic capacitor using an electrically conducting polymer as the solid electrolyte layer, and a production method thereof.

BACKGROUND ART

The basic element of a solid electrolytic capacitor is generally produced, as shown in FIG. 1, by forming a dielectric oxide film layer (2) on an anode substrate (1) comprising a metal foil subjected to an etching treatment to have a large specific surface area, forming a solid semiconductor layer (hereinafter referred to as a "solid electrolyte") (4) as a counter electrode on the outer side of the dielectric oxide layer, and preferably further forming thereon an electrically conducting layer (5) such as electrically conducting paste. Using this element as-is alone or after stacking these elements, lead wires (6, 7) are connected thereto and the entirety is then completely encapsulated with epoxy resin (8) or the like and used as a capacitor (9) part in electric products over a wide range.

With recent progress of digitization of electric devices or high-speed processing of personal computers, a compact and large-capacitance capacitor or a capacitor assured of low impedance in the high frequency region is being demanded. In order to meet this requirement, it has been recently proposed to use an electrically conducting polymer having electron conductivity as the solid electrolyte.

As for the technique of forming an electrically conducting polymer on a dielectric oxide film, an electrolytic oxidative polymerization method and a chemical oxidative polymerization method are generally known. In the chemical oxidative polymerization method, the reaction or the polymer film morphology is difficult to control, but the formation of solid electrolyte is easy and since this enables mass production in a short time, various methods have been proposed thereon. For example, a method of alternately repeating a step of dipping an anode substrate in a monomer-containing solution and a step of dipping the substrate in an oxidizing agent-containing solution, thereby forming a solid electrolyte having a layer structure, has been disclosed (see, Japanese Patent Publication No. 3,187,380 (EP 971382 A1). According to this method, a high-capacitance and low-impedance solid electrolytic capacitor with excellent heat resistance can be produced by forming a solid electrolyte layer having a layer structure with a film thickness of 0.01 to 5 μm. However, this method has a problem that the space between layers of the layer structure part constituting the solid electrolyte layer is large. In the light of use as an element for a multilayer capacitor fabricated by stacking a plurality of capacitor elements, it is demanded to further reduce the thickness of the solid electrolyte layer as a whole.

With respect to the method for forming a solid electrolyte inside pores as well as on the outer surface of a capacitor element without forming a solid electrolyte layer having a layer structure, a method of repeating a cycle consisting of dipping an anode substrate in a monomer compound-containing solution, performing polymerization in an oxidizing agent solution, washing the oxidizing agent and drying the substrate has been disclosed (see, JP-A-9-306788 (the term "JP-A" as used herein means an "unexamined published Japanese patent application")). However, the solid electrolyte layer formed by this method is insufficient in the resistance against external stress, because a space is not present between layers.

On the other hand, a method of accelerating the formation of an electrically conducting polymer film by preparing the monomer-containing solution or oxidizing agent-containing solution as a suspension containing fine particles has been proposed and with respect to the fine particle added, there have been disclosed a method of adding electrically conducting polymer particles (see, Japanese Patent Publication No. 3,478,987), a method of adding colloid particles containing polymer fine particles (see, JP-A-9-306788) and a method of adding inorganic fine particles (see, Patent Document 4; JP-A-11-283875).

DISCLOSURE OF THE INVENTION

A solid electrolytic capacitor having a predetermined capacitance is usually produced by stacking a plurality of capacitor elements, connecting an anode lead wire to the anode terminal, connecting a cathode lead wire to the electrically conducting layer containing an electrically conducting polymer, and encapsulating the entirety with epoxy resin or the like. In such a solid electrolytic capacitor, the electrically conducting polymer needs to be made thick by controlling the polymerization conditions of the electrically conducting polymer in the cathode portion of the capacitor element. If the polymerization conditions of the electrically conducting polymer in the cathode portion of the capacitor element are not precisely controlled, the thickness of the electrically conducting polymer becomes uneven and the electrically conducting polymer comes to have a thin portion, in which direct contact of the paste or the like with the dielectric oxide film layer readily occurs, giving rise to increase in the leakage current. Furthermore, since the number of capacitor elements which can be stacked in a solid electrolytic capacitor chip having a predetermined size is limited by the thickness of the element, the capacitance of the solid electrolytic capacitor chip cannot be increased. In addition, if the coverage thickness of the electrically conducting polymer is not uniform, the contact area between a capacitor element and a capacitor element stacked decreases and this causes a problem that the equivalent series resistance (ESR) becomes large.

Accordingly, an object of the present invention is to solve those problems, that is, to stably produce a thin capacitor element without increasing short circuit failures while ensuring less fluctuation in the element shape, achieve high capacitance by increasing the number of capacitor elements stacked in a solid electrolytic capacitor chip, and provide a solid electrolytic multilayer capacitor element with less fluctuation in the equivalent series resistance and a production method thereof.

The present inventors have made intensive studies in the light of the above-described object, as a result, they have found that in the method of forming a solid electrolyte layer by polymerizing a monomer with use of an oxidizing agent on a dielectric film formed on a valve-acting metal surface having fine pores, adding a step of dipping the valve-acting metal in an oxidizing agent-free solution (hereinafter simply referred to as Step 3) to the conventionally known steps of dipping the valve-acting metal in a monomer-containing solution (hereinafter simply referred to as Step 1) and dipping the valve-acting metal in an oxidizing agent-containing suspension (hereinafter simply referred to as Step 2) can greatly narrow the gap (space) between polymer layers having a layer structure and thereby enable to form a dense solid electrolyte with excellent shape stability. The present invention has been accomplished based on this finding.

In the chemical oxidative polymerization of repeatedly performing a dipping step in a monomer solution (Step 1) and a dipping step in an oxidizing agent solution (Step 2), the shape of the solid electrolyte naturally becomes a layer structure. The oxidizing agent layer sandwiched between polymer layers is finally removed as an unnecessary layer in the washing step and turns into a space layer. Considering that the final shape of the solid electrolyte is determined by the thickness of this space layer, it has been found that even though the oxidizing agent layer is partially removed by the dipping for a very short time after each polymerization using the oxidizing agent, the polymerization reaction is completed by the remaining oxidizing agent.

The solid electrolytic capacitor obtained in this way is confirmed to be enhanced in the adhesive property of the solid electrolyte formed on the dielectric film and assured of high capacitance and reduction in the dielectric loss (tan δ), leakage current and defective ratio.

Furthermore, it is confirmed that downsizing and high capacitance of a capacitor can be realized by stacking a plurality of the above-described solid electrolytic capacitor elements having excellent properties.

The present invention relates to a solid electrolytic capacitor and a production method thereof described in the following 1 to 13.

1. A method for producing a solid electrolytic capacitor in which a dielectric film layer is formed on a valve-acting metal surface having fine pores and a solid electrolyte layer comprising an electrically conducting polymer composition is provided on the dielectric film by polymerizing a monomer with use of an oxidizing agent, the method providing the solid electrolyte layer by a process comprising a step of dipping a valve-acting metal having thereon a dielectric film layer in a monomer-containing solution, followed by drying (Step 1), a step of dipping the valve-acting metal in an oxidizing agent-containing solution, followed by drying (Step 2), and a step of dipping the valve-acting metal in an oxidizing agent-free solution, followed by drying (Step 3).

2. The method for producing a solid electrolytic capacitor as described in 1 above, wherein the residual ratio of the solid electrolyte after washing, which is represented by the formula: (mass of the net solid electrolyte which remained on the surface of the aluminum foil after washing in the warm water and drying)/(mass of the solid electrolyte containing impurities formed on the surface of the aluminum foil before washing in warm water)×100, is 55 to 90%.

3. The method for producing a solid electrolytic capacitor as described in 1 above, wherein Step 1 of dipping a valve-acting metal having thereon a dielectric film layer in a monomer compound-containing solution, followed by drying, Step 2 of dipping the valve-acting metal in an oxidizing agent-containing solution, followed by drying, and Step 3 of dipping the valve-acting metal in an oxidizing agent-free solution, followed by drying, are repeated multiple times.

4. The method for producing a solid electrolytic capacitor as described in 1 above, wherein Step 1 of dipping a valve-acting metal having thereon a dielectric film layer in a monomer compound-containing solution, followed by drying, and Step 2 of dipping the valve-acting metal in an oxidizing agent-containing solution, followed by drying, are repeated multiple times after Step 1 of dipping a valve-acting metal having thereon a dielectric film layer in a monomer compound-containing solution, followed by drying, Step 2 of dipping the valve-acting metal in an oxidizing agent-containing solution, followed by drying, and Step 3 of dipping the valve-acting metal in an oxidizing agent-free solution, followed by drying, are repeated multiple times.

5. The method for producing a solid electrolytic capacitor as described in any one of 1 to 4 above, wherein the oxidizing agent-free solution is water or an aqueous solution of a dopant compound and/or a surfactant.

6. The method for producing a solid electrolytic capacitor as described in 1 to 5 above, wherein the time period for dipping and keeping the valve-acting metal in the oxidizing agent-free aqueous solution is from 0.1 to 120 seconds.

7. The method for producing a solid electrolytic capacitor as described in any one of 1 to 4 above, wherein the oxidizing agent is a persulfate.

8. The method for producing a solid electrolytic capacitor as described in any one of 1 to 6 above, wherein the oxidizing agent-free solution is a suspension containing organic fine particles.

9. The method for producing a solid electrolytic capacitor as described in 8 above, wherein the average particle diameter ($D_{50}$) of the organic fine particles is from 1 to 20 μm.

10. The method for producing a solid electrolytic capacitor as described in 9 above, wherein the organic fine particle is at least one member selected from the group consisting of an aliphatic sulfonic acid compound, an aromatic sulfonic acid compound, an aliphatic carboxylic acid compound, an aromatic carboxylic acid compound, a salt thereof, and a peptide compound.

11. The method for producing a solid electrolytic capacitor as described in any one of 1 to 10 above, wherein the oxidizing agent containing-solution contains a surfactant.

12. A solid electrolytic capacitor produced by the production method described in any one of 1 to 11 above.

13. A solid electrolytic capacitor in which a dielectric film layer is formed on a valve-acting metal surface having fine pores and a solid electrolyte layer, and the percentage occupancy of space between layers of the solid electrolyte in the entire solid electrolyte layer is from 0.1 to 20%.

BEST MODE FOR CARRYING OUT THE INVENTION

Figure 1:
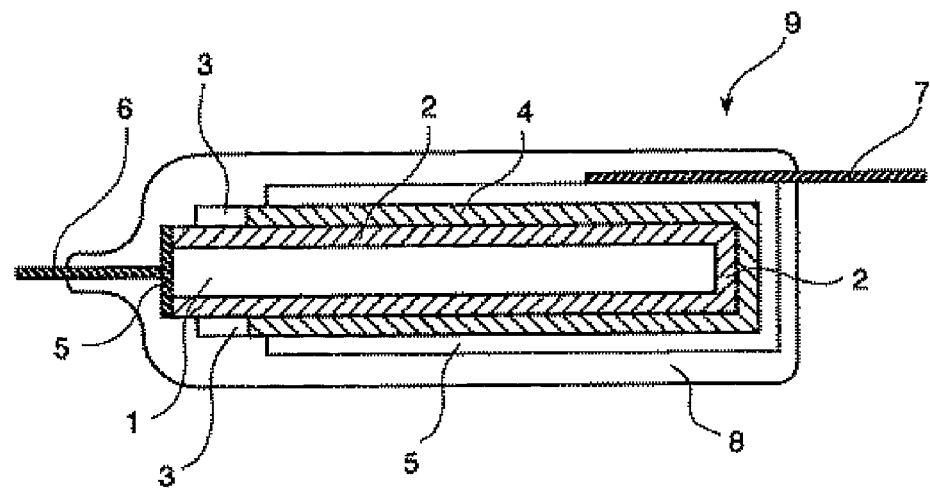
FIG. 1 is a cross-sectional view showing an example of the solid electrolytic capacitor using a capacitor element.

The method of the present invention is described below by referring to the drawings attached.

The dielectric film (2) on the surface of a substrate (1) for use in the present invention is usually formed by subjecting a porous shaped body of a valve-acting metal to a chemical forming treatment or the like.

The valve-acting metal, which can be used in the present invention, is a single metal such as aluminum, tantalum, niobium, titanium, zirconium, magnesium and silicon, or an alloy thereof. The porous morphology may be any morphology of a porous shaped body such as an etched product of a rolled foil or sintered body of fine powder.

With respect to the anode substrate, the above-described metal may be used in the form of, for example, a porous sintered body, a plate (including ribbon, foil, etc.) surface-treated by etching or the like, or a wire, but a plate-like or foil-like material is preferred. As for the method of forming a dielectric oxide film on the surface of this metal porous body, a known method may be used. For example, in the case of using an aluminum foil, the oxide film can be formed by anodizing the aluminum foil in an aqueous solution containing boric acid, phosphoric acid, adipic acid, a sodium or ammonium salt thereof or the like. In the case of using a sintered body of tantalum powder, the oxide film can be formed thereon by anodizing the sintered body in an aqueous phosphoric acid solution.

The thickness of the valve-acting metal foil varies depending on, for example, the use end, but a foil having a thickness of about 40 to 300 μm is used. In order to produce a thin solid electrolytic capacitor, for example, in the case of an aluminum foil, it is preferred to use an aluminum foil having a thickness of 80 to 250 μm and set the maximum height of a device having provided therein a solid electrolytic capacitor to 250 μm or less. The size and the shape of the metal foil also vary depending on the use end, but the metal foil preferably has, in terms of a plate-like device unit, a rectangular shape with a width of approximately from 1 to 50 mm and a length of approximately from 1 to 50 mm, more preferably a width of approximately from 2 to 15 mm and a length of approximately from 2 to about 25 mm.

The chemical formation solution and the chemical formation conditions (e.g., chemical formation voltage) for use in the chemical formation are previously confirmed by an experiment and set to appropriate values according to the capacitance, breakdown voltage and the like required for the solid electrolytic capacitor produced. At the chemical formation treatment, a masking (3) is generally provided for preventing the chemical formation solution from bleeding up to the portion working out to the anode of the solid electrolytic capacitor and at the same time, for ensuring the insulation of the anode from the solid electrolyte (4) (cathode part) which is formed in the later step.

As for the masking material, for example, a composition comprising a general heat-resistant resin, preferably a solvent-soluble or solvent-swellable heat-resistant resin or a precursor thereof, and also comprising an inorganic fine powder and a cellulose-based resin may be used, but the material is not limited. Specific examples thereof include a polyphenylsulfone (PPS), a polyethersulfone (PES), a cyanate ester resin, a fluororesin (e.g., tetrafluoroethylene, tetrafluoroethylene-perfluoroalkyl vinyl ether copolymer), a low molecular polyimide, and a derivative or a precursor thereof. Among these, preferred are low molecular polyimide, polyethersulfone, fluororesin, and a precursor thereof.

The present invention is based on the chemical oxidative polymerization of an organic polymerizable monomer, comprising a step of dipping a valve-acting metal porous substrate in an oxidizing agent solution, and then drying it to gradually elevate the concentration of the oxidizing agent solution on the substrate. In the chemical oxidative polymerization method of the present invention, a monomer is attached on the dielectric film having fine pores on the anode substrate, oxidative polymerization is brought about in the presence of a compound capable of serving as the dopant of an electrically conducting polymer, and the produced polymer composition is formed as the solid electrolyte on the dielectric surface.

The solid electrolyte layer of an electrically conducting polymer produced by the method of the present invention has a fibril structure or a lamella (thin layer-like) structure. These structures have widespread over-lapping among the polymer chains. In the present invention, it has been found that when the thickness of the entire solid electrolyte layer is from about 10 to about 100 μm, the space in the layer structure of polymer is from 0.01 to 5 μm, preferably from 0.05 to 3 μm, more preferably from 0.1 to 2 μm, and the percentage occupancy of space between layers of the solid electrolyte in the entire polymer film is from 0.1 to 20%, electron hopping between polymer chains is facilitated and the electric conductivity as well as properties such as low impedance are enhanced.

The method of forming a solid electrolyte layer on the dielectric film formed on the valve-acting metal surface having fine pores in the present invention is described step by step below.

In the present invention, Step 1 of dipping the valve-acting metal in a monomer containing solution, followed by drying, is performed to supply a monomer on the dielectric surface and on the polymer composition. After impregnating the monomer-containing solution to uniformly attach the monomer on the dielectric surface and on the polymer composition, the valve-acting metal is left standing in air for a fixed time to vaporize the solvent. At this time, the conditions vary depending on the kind of the solvent, but the standing is generally performed at a temperature from 0° C. to the boiling point of the solvent. The standing time varies depending on the kind of the solvent but is generally from 5 seconds to 15 minutes. For example, in the case of an alcohol-based solvent, standing of 5 minutes or less may be sufficient. With this standing time, the monomer can be uniformly attached on the dielectric surface and at the next step of dipping the valve-acting metal in an oxidizing agent-containing solution, contamination can be reduced.

The supply of the monomer can be controlled by the kind of the solvent used in the monomer-containing solution, the concentration of the monomer-containing solution, the temperature of the solution, the dipping time and the like.

The dipping time in Step 1 is from a time long enough to allow for attachment of the monomer component in the monomer-containing solution on the dielectric surface of the metal foil substrate to less than 15 minutes, preferably from 0.1 second to 10 minutes, more preferably from 1 second to 7 minutes.

The dipping temperature is preferably from −10 to 60° C., more preferably from 0 to 40° C. If the dipping temperature is lower than −10° C., volatilization of the solvent takes time and the reaction time is disadvantageously prolonged, whereas if it exceeds 60° C., volatilization of the solvent and the monomer cannot be neglected and the concentration control becomes difficult.

The drying temperature in Step 1 of the present invention is preferably in a range from room temperature to the boiling temperature of the solvent to be used. The drying time can be appropriately selected depending on the combination of the drying temperature, atmosphere, air speed, humidity and the like. Specifically, the drying time is preferably from one second to one hour, more preferably from 10 seconds to 30 minutes, still more preferably from 30 seconds to 10 minutes.

The monomer-containing solution is not particularly limited in the concentration and may have an arbitrary concentration, but in view of excellent impregnation into fine pores of the valve-acting metal, the concentration is preferably from 3 to 70 mass %, more preferably from 25 to 45 mass %.

Examples of the solvent usable for the solution used in Step 1 include ethers such as tetrahydrofuran (THF), dioxane and diethylether; ketones such as acetone and methyl ethyl ketone; aprotic polar solvents such as dimethylformamide, acetonitrile, benzonitrile, N-methylpyrrolidinone (NMP) and dimethylsulfoxide (DMSO); esters such as ethyl acetate and butyl acetate; non-aromatic chlorine-based solvents such as chloroform and methylene chloride; nitro compounds such as nitromethane, nitroethane and nitrobenzene; alcohols such as methanol, ethanol and propanol; water; and a mixed solvent thereof. Among these, preferred are alcohols, ketones and a mixed system thereof.

In the present invention, the monomer is oxidatively polymerized in Step 2 of dipping the valve-acting metal in an oxidizing agent-containing solution and holding it in air within a predetermined range of temperature for a predetermined time. In order to form a polymerization film with more dense morphology, a method in which the oxidative polymerization is predominately performed during holding in air is preferred. The temperature at the holding in air varies depending on the kind of the monomer but, for example, in the case of pyrrole, the temperature may be 5° C. or less and in the case of a thiophene-based monomer, the temperature needs to be approximately from 30 to 60° C.

The polymerization time depends on the coverage of the monomer at the dipping. The coverage varies depending on the concentration, viscosity or the like of the monomer-containing or oxidizing agent-containing solution and cannot be unequivocally specified, but in general, the polymerization time can be shortened with a thin coverage per once and the polymerization takes a long time with a thick coverage per once. In the method of the present invention, the polymerization time per once is from 10 seconds to 30 minutes, preferably from 3 to 15 minutes.

The dipping time in Step 2 is from a time long enough to allow for attachment of the oxidizing agent component on the dielectric surface of the metal foil substrate to less than 15 minutes, preferably from 0.1 second to 10 minutes, more preferably from 1 second to 7 minutes.

The oxidizing agent used in Step 2 includes an aqueous-solution-type oxidizing agent and an organic solvent-type oxidizing agent. Examples of the aqueous solution-type oxidizing agent preferably used in the present invention include peroxodisulfuric acid and Na, K and $NH_4$ salts thereof, cerium(IV) nitrate, ceric(IV) ammonium nitrate, iron(III) sulfate, iron(III) nitrate and iron(III) chloride. Examples of the organic solvent-type oxidizing agent include a ferric salt of an organic sulfonic acid, such as iron(III) dodecylbenzenesulfonate and iron(III) p-toluenesulfonate.

Examples of the solvent for the solution used in Step 2 of the present invention include ethers such as tetrahydrofuran (THF), dioxane and diethylether; ketones such as acetone and methyl ethyl ketone; aprotic polar solvents such as dimethylformamide, acetonitrile, benzonitrile, N-methylpyrrolidinone (NMP) and dimethylsulfoxide (DMSO); alcohols such as methanol, ethanol and propanol; water; and a mixed solvent thereof. Among these, preferred are water, alcohols, ketones and a mixed system thereof.

The concentration of the oxidizing agent solution is preferably from 5 to 50 mass %, and the temperature of the oxidizing agent solution is preferably from −15 to 60° C.

The drying temperature in Step 2 of the present invention is preferably in a range from room temperature to the boiling temperature of the solvent to be used. The drying time can be appropriately selected depending on the combination of the drying temperature, atmosphere, air speed, humidity and the like. Specifically, the drying time is preferably from one second to one hour, more preferably from 10 seconds to 30 minutes, still more preferably from 30 seconds to 10 minutes.

The drying step performed after the dipping in Step 2 of the present invention is intended to evaporate the solvent and to concentrate the oxidizing agent. In the drying step, the chemical oxidative polymerization of the monomer coming into contact with the oxidizing agent proceeds and solid electrolyte is formed.

In the present invention, Step 3 of dipping the valve-acting metal in an oxidizing agent-free solution, followed by drying, is performed to partially remove the oxidizing agent formed on the dielectric surface or on the polymer composition through drying after Step 2. By the dipping (not washing) in the solution, the oxidizing agent formed on the dielectric surface or on the polymer composition through drying is mostly dissolved and removed. The dissolved oxidizing agent is present while forming a diffusion layer in the vicinity thereof, but because of its low concentration, the oxidizing agent layer remaining on the dielectric surface or on the polymer composition due to reattachment is significantly reduced as compared with that at the stage of Step 2. On the other hand, the oxidizing agent permeated into the polymer composition is scarcely dissolved and removed by the short-time dipping in Step 3, so that the excess (unreacted) monomer remaining without reacting in the polymerization step can be polymerized in the next step and a solid electrolyte comprising an electrically conducting polymer in a layer structure having widespread overlapping can be formed.

The dipping time in Step 3 is specifically from 0.1 to 120 seconds, preferably from 0.1 to 60 seconds, more preferably from 0.1 to 30 seconds.

The oxidizing agent layer is completely dissolved and removed in the washing process after the formation of the solid electrolyte and the space in which the oxidizing agent has been present forms a polymerization film constituting a layer structure.

The interlayer distance between a polymerization film and a polymerization film constituting a layer structure is from 0.01 to 5 μm, preferably from 0.1 to 2 μm.

Also, the mass of the polymerization film after the oxidizing agent is dissolved and removed through the dipping process is preferably from 55 to 90%, more preferably from 60 to 85%, based on the mass of the polymerization film containing the oxidizing agent.

In the present invention, the ratio of the space to the volume of the polymerization film after the dissolution and removal of oxidizing agent is preferably from 0.01 to 20%, more preferably from 0.1 to 10%, still more preferably from 0.5 to 10%.

The solution used in Step 3 may be either a solvent capable of dissolving the oxidizing agent used in Step 2 or a solution capable of dissolving the oxidizing agent. Specific examples of the solvent used here include water; alcohols such as methanol, ethanol and propanol; and an aprotic polar solvent such as dimethylformamide, N-methyl-2-pyrrolidinone and dimethylsulfoxide. Among these, water and alcohols are preferred, and water is more preferred.

Conventionally, when an oxidizing agent in a high concentration is used, the inlet to a fine pore in the valve-acting metal having fine pores is closed by the polymerization film or oxidizing agent and the supply of the monomer or oxidizing agent into the pore does not proceed any more, giving rise to insufficient formation of a polymerization film in the pore, which causes, for example, reduction in the appearance ratio of capacitance or increase of leakage current. In the method of the present invention, the oxidizing agent not functioning as a polymerization film is removed as an unnecessary portion every each polymerization and not allowed to close the inlet into the pore and this is effective in forming a dense polymerization film.

In Step 2 and/or Step 3, a suspension containing organic fine particles is preferably used. The organic fine particle remains on the dielectric surface or polymer composition and effectively promotes the supply of the oxidizing agent or monomer to the smooth polymerization film surface after the pore is filled with a polymerization film. In particular, when soluble organic fine particles are used, they can be dissolved and removed after the formation of the solid electrolyte layer and the reliability of the capacitor element can be enhanced.

Examples of the solvent used in the process of dissolving and removing organic fine particles include water; alcohols such as methanol, ethanol and propanol; ketones such as acetone and methyl ethyl ketone; and an aprotic polar solvent such as dimethylformamide, N-methyl-2-pyrrolidinone and dimethylsulfoxide. Among these, water, alcohols, and a mixed solvent thereof are preferred. A solvent of dissolving the oxidizing agent as well is more preferred, because the removal of the oxidizing agent can be simultaneously effected.

A soluble inorganic fine particle removable with use of a strong acid causes damage such as dissolution or corrosion also of the dielectric film on the valve-acting metal surface and therefore, is not preferred.

The soluble organic fine particle preferably has an average particle diameter ($D_{50}$) of 0.1 to 20 μm, more preferably from 0.5 to 15 μm. If the average particle diameter ($D_{50}$) of the soluble organic fine particle exceeds 20 μm, the gap formed in the polymer film disadvantageously becomes large, whereas if it is less than 0.1 μm, the effect of increasing the amount of solution attached is not obtained and becomes equal to that of water.

Specific examples of the soluble organic fine particle include an aliphatic sulfonic acid compound, an aromatic sulfonic acid compound, an aliphatic carboxylic acid compound, an aromatic carboxylic acid compound, a peptide compound, and/or a salt thereof. Among these, preferred are an aromatic sulfonic acid compound, an aromatic carboxylic acid compound and a peptide compound.

Specific examples of the aromatic sulfonic acid compound include a benzenesulfonic acid, a toluenesulfonic acid, a naphthalenesulfonic acid, an anthraquinonesulfonic acid, and/or a salt thereof; specific examples of the aromatic carboxylic acid compound include a benzoic acid, a toluenecarboxylic acid, a naphthalenecarboxylic acid, an anthracenecarboxylic acid, an anthraquinonecarboxylic acid, and/or a salt thereof; and specific examples of the peptide compound include surfactin, iturin, plipastatin and serrawettin.

In Step 2 and/or Step 3, the polymerization film can be formed further evenly by using a surfactant. That is, during the concentration process of the oxidizing agent solution, a surfactant enables to form a more even polymerization film by inhibiting the entire coverage of the oxidizing agent solution on the surface of the aluminum foil from being broken and thereby preventing the oxidizing agent solution from aggregation caused by drying. Also, when the oxidizing agent having been dissolved in a solvent reattaches on the surface of the aluminum foil in the form of an oxidizing agent solution, a surfactant enables to form a more even polymerization film by inhibiting the inhibiting the entire coverage of the oxidizing agent solution on the surface of the aluminum foil from being broken and thereby preventing the oxidizing agent solution from aggregation caused by drying. The surfactant includes anionic surfactant, cationic surfactant, amphoteric surfactant, nonionic surfactant, silicone surfactant, peptide surfactant and the like, and preferably is the one which can be removed by washing after the solid electrolyte is formed.

Specific examples of the anionic surfactant include alkylsulfate ester, polyoxyethylene alkyl ether sulfate, alkyl benzenesulfonate, alkyl naphthalenesulfonate, alkyl sulfosuccinate, alkyl diphenyletherdisulfonate, fatty acid, perfluoro fatty acid, naphthalenesulfonate formaldehyde and salts thereof.

Specific examples of the nonionic surfactant include polyoxyethylene alkyl ether, polyoxyalkylene alkyl ether, polyoxyethylene derivatives, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene hydrogenated castor oil, polyoxyethylene alkyl amine and alkyl alkanolamide.

Examples of the amphoteric surfactant include alkyl betaine and amine oxide, and examples of the peptide surfactant include surfactin, iturin, plipastatin and serrawettin.

Among these specific examples, preferable are alkyl benzenesulfonate, alkyl naphthalenesulfonate, alkyl sulfosuccinate, alkyl diphenyletherdisulfonate, aliphatic acid and perfluoro aliphatic acid as an anionic surfactant, and polyoxyethylene alkyl ether and polyoxyalkylene alkyl ether as a nonionic surfactant.

In the present invention, the number of impregnations needs to be controlled so as to form an electrically conducting polymer composition having a thickness large enough to be resistant to humidity, heat, stress and the like.

One preferred process of forming solid electrolyte according to the present invention is a method of repeating the steps of Step 1, Step 2 and Step 3 as one cycle. This cycle is repeated 3 times or more, preferably from 8 to 30 times, for one anode substrate, whereby a desired solid electrolyte layer can be formed. Incidentally, the order of Step 1 and Step 2 may be reversed, but Step 3 is performed after Step 2.

Another preferred process of forming the solid electrolyte according to the present invention is a method of repeating the steps of Step 1, Step 2 and Step 3 as one cycle (hereinafter simply referred to as Cycle A), and then repeating the steps of Step 1 and Step 2 as one cycle (hereinafter simply referred to as Cycle B). Cycle A is repeated 3 times or more, preferably from 4 to 10 times, for one anode substrate and then Cycle B is repeated 3 times or more, preferably from 4 to 30 times, for one anode substrate, whereby a desired solid electrolyte layer can be formed.

According to the present invention, as described in Examples later, an aluminum foil having thereon a dielectric oxide film is dipped, for example, in an isopropyl alcohol (IPA) solution of 3,4-ethylenedioxythiophene (EDT), air-dried to mostly remove the IPA, dipped in an aqueous solution containing about 20 mass % of an oxidizing agent (ammonium persulfate) and then heated at about 40° C. for 10 minutes, or this procedure is repeated, whereby a polymer of poly(3,4-ethylenedioxythiophene) can be obtained.

The electrically conducting polymer for forming the solid electrolyte for use in the present invention is a polymer of an organic polymer monomer having a π-electron conjugated structure. The polymerization degree is from 2 to 2,000, preferably from 3 to 1,000, more preferably from 5 to 200. Specific examples thereof include an electrically conducting polymer containing, as a repeating unit, a structure shown by a compound having a thiophene skeleton, a compound having a polycyclic sulfide skeleton, a compound having a pyrrole skeleton, a compound having a furan skeleton, or a compound having an aniline skeleton.

Examples of the monomer having a thiophene skeleton include a derivative such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene and 3,4-ethylenedioxythiophene. Such a compound may be a compound generally available on the market or may be prepared by a known method (see, for example, *Synthetic Metals*, Vol. 15, page 169 (1986)).

Specific examples of the monomer having a polycyclic sulfide skeleton include a compound having a 1,3-dihydropolycyclic sulfide (also called 1,3-dihydrobenzo[c]thiophene)skeleton, and a compound having a 1,3-dihydronaphtho[2,3-c]thiophene skeleton. Other examples include a compound having a 1,3-dihydroanthra[2,3-c]thiophene skeleton, and a compound having a 1,3-dihydronaphthaceno[2,3-c]thiophene skeleton. Such a compound can be prepared by a known method, for example, the method described in JP-A-8-3156 (U.S. Pat. No. 5,530,139).

In addition, for example, a 1,3-dihydrophenanthra[2,3-c]thiophene derivative as a compound having a 1,3-dihydronaphtho[1,2-c]thiophene skeleton, and a 1,3-dihydrobenzo[a]anthraceno[7,8-c]thiophene derivative as a compound having a 1,3-dihydrotriphenylo[2,3-c]thiophene skeleton can be used.

A compound optionally containing nitrogen or N-oxide in the condensed ring may also be used and examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide.

Specific examples of the monomer having a pyrrole skeleton include a derivative such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole. Such a compound may be a commercially available product or may be prepared by a known method.

Specific examples of the monomer having a furan skeleton include a derivative such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenenfuran, 3,4-methylenedioxyfuran and 3,4-ethylene-dioxyfuran. Such a compound may be a commercially available product or may be prepared by a known method.

Specific examples of the monomer having an aniline skeleton include a derivative such as 2-methylaniline, 2-ethylaniline, 2-propylaniline, 2-butylaniline, 2-pentyl-aniline, 2-hexylaniline, 2-heptylaniline, 2-octylaniline, 2-nonylanilin, 2-decylaniline, 2-fluoroaniline, 2-chloroaniline, 2-bromoaniline, 2-cyanoaniline, 2,5-dimethylaniline, aniline, 2,5-diethylaniline, 2,3-butyleneaniline, 2,3-methylenedioxyaniline and 2,3-ethylenedioxyaniline. Such a compound may be a commercially available product or may be prepared by a known method.

Among these, the compounds having a thiophene or polycyclic sulfide skeleton are preferred, and 3,4-ethylenedioxythiophene (EDT) and 1,3-dihydroisothianaphthene are more preferred.

The polymerization conditions and the like of the compound selected from the group consisting of the above-described compounds are not particularly limited and the polymerization may be easily performed after previously confirming the preferred conditions by a simple experiment.

Also, compounds selected from the group consisting of the above-described monomers may be used in combination and the solid electrolyte may be formed as a copolymer. In this case, the compositional ratio and the like of polymerizable monomers depend on, for example, the polymerization conditions and the preferred compositional ratio and polymerization conditions may be confirmed by a simple test.

For example, a method where an EDT monomer and an oxidizing agent each preferably in the form of a solution are coated separately one after another or coated simultaneously on an oxide film layer of a metal foil to form a solid electrolyte, may be used (see, Japanese Patent 3,040,113 (U.S. Pat. No. 4,910,645) and U.S. Pat. No. 6,229,689).

The 3,4-ethylenedioxythiophene (EDT) preferably used in the present invention is well soluble in the above-described monohydric alcohol but low in the affinity for water and therefore, on contacting with an aqueous solution containing an oxidizing agent at a high concentration, the polymerization of EDT successfully proceeds on the interface thereof and an electrically conducting polymer solid electrolyte layer having a fibril structure or a lamella (thin layer-like) structure is formed.

Examples of the solvent for washing after the formation of the solid electrolyte, which can be used in the production method of the present invention, include ethers such as tetrahydrofuran (THF), dioxane and diethylether; ketones such as acetone and methyl ethyl ketone; aprotic polar solvents such as dimethylformamide, acetonitrile, benzonitrile, N-methylpyrrolidinone (NMP) and dimethylsulfoxide (DMSO); esters such as ethyl acetate and butyl acetate; a non-aromatic chlorine-based solvent such as chloroform and methylene chloride; a nitro compound such as nitromethane, nitroethane and nitrobenzene; alcohols such as methanol, ethanol and propanol; an organic acid such as formic acid, acetic acid and propionic acid; an acid anhydride of the organic acid (e.g., acetic anhydride); water; and a mixed solvent thereof. Among these, preferred are water, alcohols, ketones and a mixed system thereof.

The thus-produced solid electrolyte has an electric conductivity of about 0.1 to about 200 S/cm, preferably from about 1 to about 150 S/cm, more preferably from about 10 to about 100 S/cm.

On the electrically conducting polymer composition layer formed in this way, an electrically conducting layer is preferably provided so as to attain good electric contact with the cathode lead terminal. The electrically conducting layer is formed, for example, by coating an electrically conducting paste, applying plating or vapor deposition, or laminating an electrically conducting resin film.

In the present invention, the electrically conducting layer formed may be compressed. For example, in the case of an electrically conducting layer containing an elastic material, the compression has an effect of causing plastic deformation to render the layer thinner and also smoothing the electrically conducting layer surface.

The thus-obtained solid electrolytic capacitor element is usually connected with a lead terminal and then subjected to jacketing, for example, with a resin mold, a resin case or a metal-made jacket case or by resin dipping, thereby completing a capacitor product for various uses.

EXAMPLES

The present invention is described in greater detail below by referring to representative examples, but these are mere examples for describing the present invention, and the present invention is not limited thereto.

Example 1

A chemically formed aluminum foil (thickness: 100 µm) was cut into a size of 3 mm (short axis direction)×10 mm (long axis direction), and a polyimide solution was circumferentially coated on both surfaces in a width of 1 mm to divide the surface into a 4-mm portion and a 5-mm portion in the long axis direction and then dried to provide a masking. A voltage of 4 V was applied to the 3 mm×4 mm portion of this chemically formed foil in a 10 mass % aqueous ammonium adipate solution to chemically form the cut end part and thereby produce a dielectric oxide film. Thereafter, this 3 mm×4 mm portion of the aluminum foil was dipped in a 2.0 mol/L isopropyl alcohol (IPA) solution having dissolved therein 3,4-ethylenedioxythiophene for 5 seconds and after drying at room temperature for 5 minutes (Step 1), dipped in a 1.5 mol/L aqueous ammonium persulfate solution adjusted to have a sodium 2-anthraquinonesulfonate ($D_{50}$=11 µm; as measured with use of Master Sizer manufactured by Sysmex Corp.) concentration of 0.07 mass % for 5 seconds. Subsequently, this aluminum foil was left standing in air at 40° C. for 10 minutes to effect oxidative polymerization (Step 2). Furthermore, the aluminum foil was dipped in distilled water for 5 seconds, taken out and then left standing in air at 40° C. for 10 minutes, thereby effecting oxidative polymerization (Step 3). These impregnation step and polymerization step (Steps 1 to 3) as a whole were repeated 22 times, whereby a solid electrolyte layer of an electrically conducting polymer was formed on the outer surface of the aluminum foil. The finally produced poly(3,4-ethylenedioxythiophene) was washed with warm water at 50° C. and then dried at 100° C. for 30 minutes to complete the formation of the solid electrolyte layer. The residual ratio of the solid electrolyte after washing, which is represented by the formula: (mass of the net solid electrolyte which remained on the surface of the aluminum foil after washing in the warm water and drying)/(mass of the solid electrolyte containing impurities formed on the surface of the aluminum foil before washing in warm water)×100, was 84%.

Using a thickness meter (Digital Dial Gauge DG-205, manufactured by Peacock Corp.; accuracy: 3 µm), the thickness was measured by prudently interposing the aluminum foil into the measuring part of the thickness meter. The average film thickness of 120 elements was 140 µm and the standard deviation was 7 µm.

Figure 2:
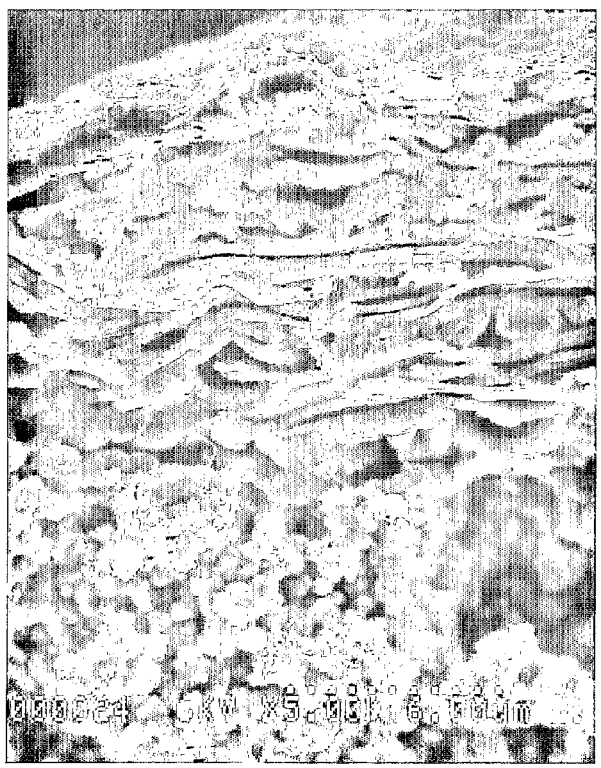
FIG. 2 is an SEM cross-sectional photograph (magnification: 5,000) of the capacitor element part of Example 1.
Figure 3:
FIG. 3 is an SEM photograph of the inside of the pores of the capacitor element part of Example 1 (magnification: 50,000).

FIG. 2 shows the cross-sectional photograph of the aluminum foil and the polymerization film on the aluminum foil when the polymerization film was observed by a scanning electron microscope (S-900, manufactured by Hitachi Ltd.). FIG. 3 shows a photo the polymerization film formed in the porous layer of the aluminum foil.

Thereafter, the 3 mm×4 mm portion having formed thereon a solid electrolyte layer was dipped in a 15 mass % aqueous ammonium adipate solution and by providing an anode contact point on the valve-acting metal foil in the portion where the solid electrolyte layer was not formed, a voltage of 3.8 V was applied to effect re-chemical formation.

Figure 4:
FIG. 4 is an SEM cross-sectional photograph (magnification: 5,000) of the capacitor element part of Example 2.
Figure 5:
FIG. 5 is an SEM photograph of the inside of the pores of the capacitor element part of Comparative Example 1 (magnification: 50,000).

After applying a carbon paste and a silver paste to the aluminum foil in the portion where the electrically conducting polymer composition layer was formed, as shown in FIG. 4, four aluminum foils were stacked and a cathode lead terminal was connected thereto. In the portion where the electrically conducting polymer composition layer was not formed, an anode lead terminal was connected by welding. The resulting device was encapsulated with epoxy resin and then subjected to aging at 125° C. for 2 hours by applying a rated voltage (2 V). In this way, 30 units in total of capacitors were completed.

The capacitance and loss factor (tan δ×100(%)) at 120 Hz, the equivalent series resistance (ESR) and the leakage current of these 30 units of capacitor devices were measured as initial properties. The leakage current was measured one minute after the rated voltage was applied. These measured values each in terms of an average value and the defective ratio assuming that the capacitor with a leakage current of 0.002 CV or more is defective, are shown in Table 1. The average value of the leakage current is a value calculated by excluding defectives.

Example 2

A chemically formed aluminum foil. (thickness: 100 µm) was cut into a size of 3 mm (short axis direction)×10 mm (long axis direction), and a polyimide solution was circumferentially coated on both surfaces in a width of 1 mm to divide the surface into a 4-mm portion and a 5-mm portion in the long axis direction and then dried to provide a masking. A voltage of 4 V was applied to the 3 mm×4 mm portion of this chemically formed foil in a 10 mass % aqueous ammonium adipate solution to chemically form the cut end part and thereby produce a dielectric oxide film. Thereafter, this 3 mm×4 mm portion of the aluminum foil was dipped in a 2.0 mol/L isopropyl alcohol (IPA) solution having dissolved therein 3,4-ethylenedioxythiophene for 5 seconds and after drying at room temperature for 5 minutes (Step 1), dipped in a 2.0 mol/L aqueous ammonium persulfate solution adjusted to have a sodium 2-anthraquinonesulfonate concentration of 0.07 mass % for 5 seconds. Subsequently, this aluminum foil was left standing in air at 40° C. for 10 minutes to effect oxidative polymerization (Step 2). Furthermore, the aluminum foil was dipped in distilled water for 5 seconds and then left standing in air at 40° C. for 10 minutes, thereby effecting oxidative polymerization (Step 3). Cycle A comprising Steps 1 to 3 was taken as one cycle and repeated 4 times.

Thereafter, the aluminum foil was dipped in the above-described monomer solution for 5 seconds, dried at room temperature for 5 minutes (Step 1), dipped in the above-described oxidizing agent-containing solution for 5 seconds, and then left standing in air at 40° C. for 10 minutes, thereby effecting oxidative polymerization (Step 2). Cycle B comprising Steps 1 and 2 were repeated 10 times, whereby a solid electrolyte layer of an electrically conducting polymer was formed on the outer surface of the aluminum foil. The finally produced poly(3,4-ethylenedioxythiophene) was washed with warm water at 50° C. and then dried at 100° C. for 30 minutes to complete the formation of the solid electrolyte layer. The residual ratio of the solid electrolyte determined by the same manner as in Example 1 was 65%.

The thickness of the aluminum foil was measured in the same manner as in Example 1, as a result, the average film thickness of 120 elements was 173 µm and the standard deviation was 12 µm.

FIG. 3 shows the cross-sectional photograph of the aluminum foil and the polymerization film on the aluminum foil when the polymerization film was observed by a scanning electron microscope (S-900, manufactured by Hitachi Ltd.).

Thereafter, the re-chemical formation, coating of a carbon paste and a silver paste, stacking, connection of a cathode lead terminal, encapsulation with epoxy resin, and aging operation were performed in the same manner as in Example 1, and 30 units in total of capacitors were completed. The properties of the obtained capacitor devices were evaluated in the same manner as in Example 1 and the results thereof are shown in Table 1.

Example 3

A solid electrolyte layer was formed in the same manner as in Example 1 except that in the dipping step in Step 3 of Example 1, a suspension prepared to have a sodium 2-anthraquinonesulfonate ($D_{50}$=11 μm) concentration of 2 mass % was used in place of distilled water and the number of repetitions of Steps 1 to 3 was changed to 9 times. The residual ratio of the solid electrolyte determined by the same manner as in Example 1 was 79%. The thickness of the aluminum foil was measured in the same manner as in Example 1, as a result, the average film thickness of 120 elements was 146 μm and the standard deviation was 16 μm.

Thereafter, 30 units of capacitors were completed in the same manner as in Example 1. The properties of the obtained capacitor devices were evaluated in the same manner as in Example 1 and the results thereof are shown in Table 1.

Example 4

A solid electrolyte layer was formed in the same manner as in Example 1 except that in the dipping step of Step 3 in Example 1, a suspension prepared by adding dropwise a 1 mol/L aqueous sulfuric acid to a 2.0 mass % aqueous Aminofect (produced by Showa Denko K.K., $D_{50}$=2 μm; surfactant peptide) solution, thereby adjusting the pH of the aqueous solution to 4, was used in place of distilled water and the number of repetitions of Steps 1 to 3 was changed to 15 times. The residual ratio of the solid electrolyte determined by the same manner as in Example 1 was 80%. The thickness of the aluminum foil was measured in the same manner as in Example 1, as a result, the average film thickness of 120 elements was 136 μm and the standard deviation was 4 μm.

Thereafter, 30 units of capacitors were completed in the same manner as in Example 1. The properties of the obtained capacitor devices were evaluated in the same manner as in Example 1 and the results thereof are shown in Table 1.

Example 5

A solid electrolyte layer was formed in the same manner as in Example 1 except that pyrrole was used in place of 3,4-ethylenedioxythiophene and the foil was dried at 3° C. for 5 minutes after the impregnation of pyrrole solution, subjected to polymerization at 5° C. for 10 minutes after the impregnation of the oxidizing agent solution and dried at 5° C. for 10 minutes after the impregnation of distilled water. The thickness of the aluminum foil was measured in the same manner, as a result, the average film thickness of 120 elements was 147 μm and the standard deviation was 8 μm. The residual ratio of the solid electrolyte determined by the same manner as in Example 1 was 75%.

Thereafter, 30 units of capacitors were completed in the same manner as in Example 1. The properties of the obtained capacitor devices were evaluated in the same manner as in Example 1 and the results thereof are shown in Table 1.

Example 6

A solid electrolyte layer was formed in the same manner as in Example 1 except that in the dipping step of Step 2 in Example 1, the chemically formed aluminum foil was dipped for 5 seconds into a suspension wherein sodium dodecylbenzenesulfonic acid was dissolved in a concentration of 0.1 mass % in a solution of 2.0 mol/l ammonium persulfate prepared to have a sodium 2-anthraquinonesulfonate ($D_{50}$=9 μm; as measured with use of Master Sizer manufactured by Sysmex Corp.) concentration of 0.07 mass % and the operation from step 1 to step 3 was repeated ten times. The thickness of the aluminum foil was measured in the same manner, as a result, the average film thickness of 120 elements was 126 μm and the standard deviation was 3 μm. The residual ratio of the solid electrolyte determined by the same manner as in Example 1 was 77%.

Thereafter, 30 units of capacitors were completed in the same manner as in Example 1. The properties of the obtained capacitor devices were evaluated in the same manner as in Example 1 and the results thereof are shown in Table 1.

Comparative Example 1

A solid electrolyte layer was formed in the same manner as in Example 1 except that Step 3 in Example 1 (an oxidative polymerization step of dipping the aluminum foil in distilled water for 5 seconds and leaving the foil to stand in air at 40° C. for 10 minutes) was not performed. The thickness of the aluminum foil was measured in the same manner, as a result, the average film thickness of 120 elements was 204 μm and the standard deviation was 31 μm The residual ratio of the solid electrolyte determined by the same manner as in Example 1 was 49%.

Figure 6:
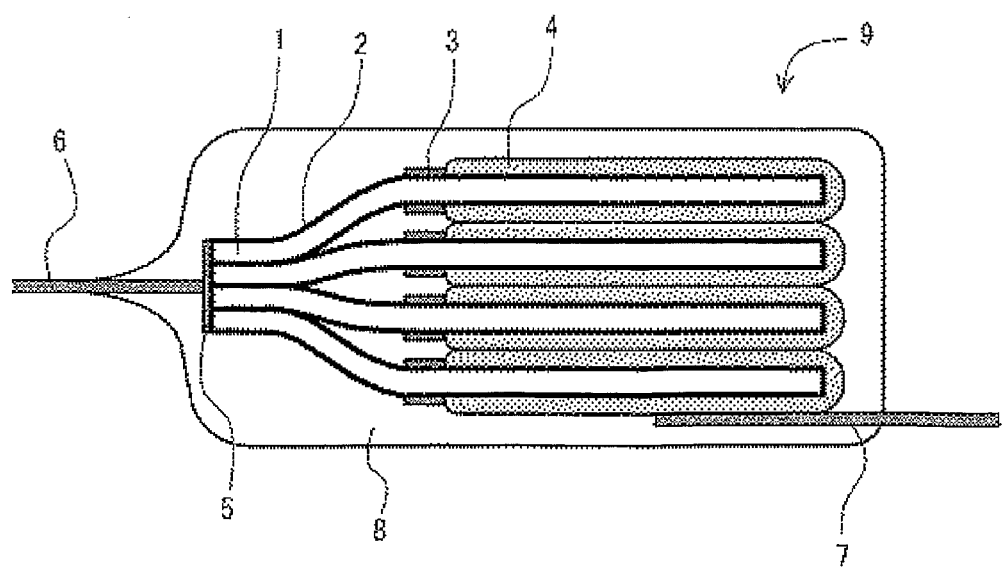
FIG. 6 is a cross-sectional view showing an example of the solid electrolytic capacitor obtained by stacking capacitor elements.

FIG. 6 shows a photo of the polymerization film formed in the porous layer of the aluminum foil by a scanning electron microscope (S-900, produced by Hitachi, Ltd.).

Thereafter, 30 units of capacitors were completed in the same manner as in Example 1. The properties of the obtained capacitor devices were evaluated in the same manner as in Example 1 and the results thereof are shown in Table 1.

Comparative Example 2

A solid electrolyte layer was formed in the same manner as in Example 1 except that Step 3 in Example 1 (an oxidative polymerization step of dipping the aluminum foil in distilled water for 5 seconds and leaving the foil to stand in air at 40° C. for 10 minutes) was not performed and the number of repetitions of Step 1 and Step 2 was changed to 15 times. The thickness of the aluminum foil was measured in the same manner, as a result, the average film thickness of 120 elements was 171 μm and the standard deviation was 26 μm. The residual ratio of the solid electrolyte determined by the same manner as in Example 1 was 50%.

Thereafter, 30 units of capacitors were completed in the same manner as in Example 1. The properties of the obtained capacitor devices were evaluated in the same manner as in Example 1 and the results thereof are shown in Table 1.

Comparative Example 3

A solid electrolyte layer was formed in the same manner as in Example 5 except that Step 3 in Example 5 (an oxidative polymerization step of dipping the aluminum foil in distilled water for 5 seconds and leaving the foil to stand in air at 5° C. for 10 minutes) was not performed. The thickness of the aluminum foil was measured, as a result, the average film thickness of 120 elements was 224 μm and the standard deviation was 36 μm. The residual ratio of the solid electrolyte determined by the same manner as in Example 1 was 51%.

Thereafter, 30 units of capacitors were completed in the same manner as in Example 1. The properties of the obtained capacitor devices were evaluated in the same manner as in Example 1 and the results thereof are shown in Table 1.

TABLE 1

| Example | Initial Properties | | | | |
|---|---|---|---|---|---|
| | Capacitance μF | Loss Factor % | ESR Ω | Leakage Current μA | Defective Ratio |
| Example 1 | 109 | 1.1 | 0.01 | 0.22 | 0/30 |
| Example 2 | 108 | 1.3 | 0.013 | 0.17 | 0/30 |
| Example 3 | 109 | 1.7 | 0.007 | 0.17 | 0/30 |
| Example 4 | 109 | 1.5 | 0.009 | 0.25 | 0/30 |
| Example 5 | 106 | 1.3 | 0.012 | 0.2 | 1/30 |
| Example 6 | 109 | 1.1 | 0.01 | 0.21 | 0/30 |
| Comparative Example 1 | 108* | 3.6 | 0.024 | 0.3 | 1/30 |
| Comparative Example 2 | 109 | 2.2 | 0.018 | 0.28 | 8/30 |
| Comparative Example 3 | 107 | 2 | 0.02 | 0.35 | 3/30 |

*Non-encapsulated (at the encapsulation, the device was partially protruded and could not be properly encapsulated).

INDUSTRIAL APPLICABILITY

According to the present invention, a thin capacitor element with reduced failure of short circuit and less fluctuation in the element shape can be stably produced, the number of capacitor elements stacked in a solid electrolytic capacitor chip can be increased to realize high capacitance, and a solid electrolytic capacitor element suitable for a solid electrolytic multilayer capacitor with less fluctuation in the equivalent series resistance can be provided.

The invention claimed is:

1. A method for producing a solid electrolytic capacitor in which a dielectric film layer is formed on a valve-acting metal surface having fine pores and a solid electrolyte layer comprising an electrically conducting polymer composition is provided on the dielectric film by polymerizing a monomer with use of an oxidizing agent, the method providing the solid electrolyte layer by a process comprising a step of dipping a valve-acting metal having thereon a dielectric film layer in a monomer-containing solution, followed by drying (Step 1), a step of dipping the valve-acting metal in an oxidizing agent-containing solution, followed by drying (Step 2), and a step of dipping the valve-acting metal in an oxidizing agent-free solution, followed by drying (Step 3);

wherein the residual ratio of the solid electrolyte after washing, which is represented by the formula: (mass of the net solid electrolyte which remained on the surface of the aluminum foil after washing in the warm water and drying)/(mass of the solid electrolyte containing impurities formed on the surface of the aluminum foil before washing in warm water)×100, is 55 to 90%.

2. The method for producing a solid electrolytic capacitor as claimed in claim 1, wherein Step 1 of dipping a valve-acting metal having thereon a dielectric film layer in a monomer compound-containing solution, followed by drying, Step 2 of dipping the valve-acting metal in an oxidizing agent-containing solution, followed by drying, and Step 3 of dipping the valve-acting metal in an oxidizing agent-free solution, followed by drying, are repeated multiple times.

3. The method for producing a solid electrolytic capacitor as claimed in claim 1, wherein Step 1 of dipping a valve-acting metal having thereon a dielectric film layer in a monomer compound-containing solution, followed by drying, and Step 2 of dipping the valve-acting metal in an oxidizing agent-containing solution, followed by drying, are repeated multiple times after Step 1 of dipping a valve-acting metal having thereon a dielectric film layer in a monomer compound-containing solution, followed by drying, Step 2 of dipping the valve-acting metal in an oxidizing agent-containing solution, followed by drying, and Step 3 of dipping the valve-acting metal in an oxidizing agent-free solution, followed by drying, are repeated multiple times.

4. The method for producing a solid electrolytic capacitor as claimed in claim 1, wherein the oxidizing agent-free solution is water or an aqueous solution of a dopant compound and/or a surfactant.

5. The method for producing a solid electrolytic capacitor as claimed in claim 1, wherein the time period for dipping and keeping the valve-acting metal in the oxidizing agent-free aqueous solution is from 0.1 to 120 seconds.

6. The method for producing a solid electrolytic capacitor as claimed in claim 1, wherein the oxidizing agent is a persulfate.

7. The method for producing a solid electrolytic capacitor as claimed in claim 1, wherein the oxidizing agent-free solution is a suspension containing organic fine particles.

8. The method for producing a solid electrolytic capacitor as claimed in claim 7, wherein the average particle diameter ($D_{50}$) of the organic fine particles is from 1 to 20 μm.

9. The method for producing a solid electrolytic capacitor as claimed in claim 8, wherein the organic fine particle is at least one member selected from the group consisting of an aliphatic sulfonic acid compound, an aromatic sulfonic acid compound, an aliphatic carboxylic acid compound, an aromatic carboxylic acid compound, a salt thereof, and a peptide compound.

10. The method for producing a solid electrolytic capacitor as claimed in claim 1, wherein the oxidizing agent containing-solution contains a surfactant.

11. A solid electrolytic capacitor produced by the production method claimed in claim 1.

* * * * *